455-616 AU 233 EX
FI28106 OR 3,284,632

INVENTORS:
WALTER K. NIBLACK
EDWIN H. WOLF
BY Spencer E. Olson
ATTORNEY

POLARIZATION MODULATION AND DEMODULATION

Filed July 31, 1963 2 Sheets-Sheet 2

INVENTORS:
WALTER K. NIBLACK
EDWIN H. WOLF

BY Spencer E. Olson

ATTORNEY 3,284,632

POLARIZATION MODULATION AND DEMODULATION

Walter K. Niblack and Edwin H. Wolf, Buffalo, N.Y., assignors to Sylvania Electric Products Inc., a corporation of Delaware Filed July 31, 1963, Ser. No. 298,894
6 Claims. (Cl. 250—199)

This invention relates to electromagnetic wave communication systems and in particular to a system utilizing polarization modulation of optical signals for communication.

In electromagnetic wave communication systems, information is placed on an energy carrier by altering one of the characteristics of the carrier. Placing information on the carrier at the transmitter is referred to as modulation and extracting information from the carrier at the receiver is referred to as demodulation.

Modulation may be achieved in an intensity or frequency modulation communication system by varying the amplitude, phase or frequency of the carrier. Modulation can also be achieved by varying the polarization of the carrier in a polarization modulation system, which is the subject of the present invention.

Systems employing intensity-modulation exhibit a considerably lower signal-to-noise ratio than a polarization modulation system. One known polarization modulation technique is disclosed in United States Patent 2,992,427, which describes a system wherein digital information is transmitted to two enabling "AND" gates with the other input being a microwave carrier signal. The AND gates are alternately enabled, one of the keyed signals being transmitted with one type of polarization and the other of the keyed signals being transmitted with a different type of polarization. At the receiving location, one keyed signal is received by an antenna responsive only to the first type of polarization, and the other is received by an antenna responsive only to the other type of polarization. In this way, a single carrier frequency may be used to transmit two binary data signals. This system has the disadvantages, however, that it is useful only for microwave systems and may only be used for carrying binary information.

Other systems have been used to transmit light beams which carry analogue information by adjusting the degree of ellipticity in a polarization modulation system. U.S. Patent No. 2,362,832, for example, discloses both radio frequency and light beam systems in which degrees of elliptical polarization represent analog information for actuating a remote relay. This patent stresses the need for rotating analyzer components in the receiver, so that they would be in proper relationship to the direction of vibration or polarization of the incident radiation. The receiving means comprise among other things a pair of receiving photocells, and the rotation of receiving components is to insure equal incidence on each. Cumbersome apparatus is necessary to effect the rotation of the receiving components, so that it would be desirable for a system to be aligned axially only, without the necessity for angular alignment of the components in the system. Furthermore, this patent does not disclose a receiver which is insensitive to linear polarization as is the receiver of the present invention.

Accordingly, it is an object of the present invention to provide an improved communications system, utilizing polarization modulation of the incident signal.

It is another object of this invention to provide an optical polarization modulation communication system, wherein the transmission of information may be analogue as well as digital.

Still another object is to provide an optical polarization modulation communication system, wherein no critical angular alignment of components in the receiver or transmitter is necessary, but axial alignment only is required.

Another object of this invention is to provide an optical communication system for which information carrying ability is in no way dependent on the time coherence of the source.

Briefly, these and other objects of the invention are accomplished in an optical communication system wherein the transmitter comprises a voltage-controlled modulation cell employed to convert the linearly polarized output of a light source to right circular, left circular or degenerate cases such as elliptically polarized light beams, depending upon the magnitude and polarity of the voltage. The receiver includes means for converting the transmitted circularly or elliptically polarized light beams to linearly polarized light beams, means for separating the linearly polarized light beams into linearly polarized light components, means for individually detecting the light components, and means, such as a difference amplifier for comparing the outputs from the detecting means.

Other objects, features, and advantages of the invention will be apparent from the following description and reference to the accompanying drawings, in which.

Figure 1:
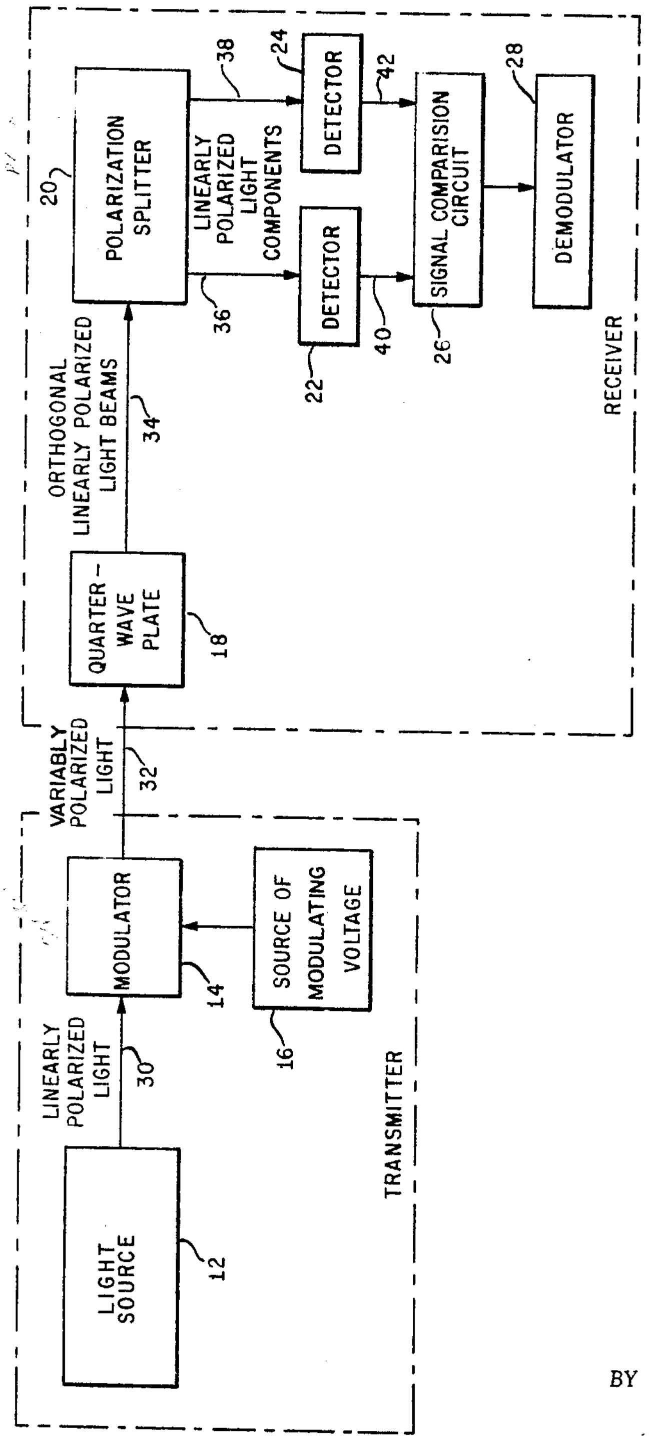
FIG. 1 is a block diagram of the optical polarization modulation communication system according to the invention.

Referring to FIG. 1 the transmitter includes a light source 12 for directing linearly polarized light 30 upon a modulator 14, for example a Pockels cell, which is controlled by a source of modulating voltage 16. The output of the Pockels cell is thereby controlled to produce variably polarized light beams 32 i.e., right and left circular, elliptical, or linearly polarized light. The receiver includes a quarter-wave plate 18, to which the variably polarized light is incident, to produce orthogonal linearly polarized light beams 34, which are directed to a polarization splitting device 20, such as a Wollaston prism. The Wollaston prism produces two divergent light components 36 and 38 representing the two directions of linear polarization from the quarter-wave plate 18. Components 36 and 38 are respectively directed to photodetectors 22 and 24, which produce electrical signals 40 and 42, respectively. The electrical signals are then directed to a signal comparison circuit 26, such as a difference amplifier, and demodulated in demodulation means 28.

Figure 2:
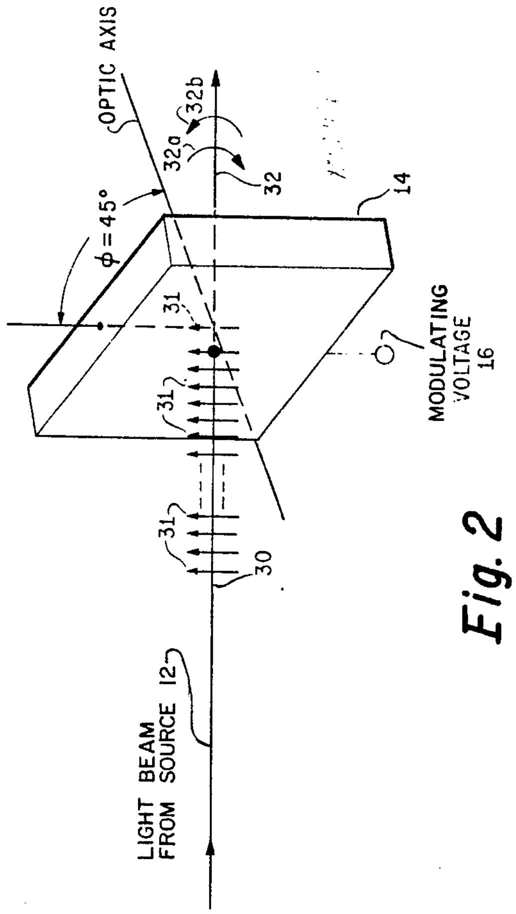
FIG. 2 is a schematic representation of the modulator portion of the transmitter of FIG. 1.

The transmitter comprises a continuous-wave laser 12, or other source, to thereby produce a highly directional, but not necessarily coherent, light beam, which is linearly polarized, and a Pockels cell modulator system. Referring to FIG. 2, the linearly polarized light beam 30 is then applied to a Pockels cell, so that the direction of vibration 31 is at an angle of 45 degrees to the optic axes of the Pockels cell. The operation of the Pockels cell is well known in the art but a brief explanation will clarify the description at this point. When two simple periodic motions of the same frequency are impressed simultaneously on the same point, the two motions having displacements in perpendicular directions, the resulting motion is an ellipse and is given by the equation $$\sin^2(\alpha_2-\alpha_1)=\frac{y^2}{r_1^2}+\frac{x^2}{r_2^2}-\frac{2y^2}{r_1r_2}\cos(\alpha_2-\alpha_1)$$

where the direction of the first motion is $y$ and the equation of the first motion is $$y=r_1\sin(\omega t+\alpha_1)$$

and the direction of the second motion is $x$ and the equation of the second motion is $$x=r_2\sin(\omega t+\alpha_2)$$

The foregoing equations designate $y$ as the direction of the first motion and $x$ as the direction of the second motion with $r_1$ and $r_2$ designating the amplitude of vibration along the major and minor axes of resultant motion. $\omega t+\alpha$ represents angular displacement and $\alpha_1$ and $\alpha_2$ are the phases of the first and second motions, respectively. When $(\alpha_1-\alpha_2)$ is equal to $\pi/2$ or 90 degrees, the major and minor axes, $r_1$ and $r_2$ coincide respectively with the axes of the directions of motion $y$ and $x$ to give an upright ellipse or a circle, if amplitudes are equal. Therefore, if the vibrations of the incident light from the source 12, which is linearly polarized, is applied to a point on the Pockels cell 14 at an angle of 45 degrees to the optic axes, these vibrations can be thought of as an oscillating electric field having two perpendicular components of equal amplitude each defined as simple periodic motions which are in phase with each other $(\alpha_1=\alpha_2)$. If one of these components is delayed in phase by 45 degrees and the other is advanced in phase by 45 degrees the resulting phase difference is 90 degrees and the resulting motion is a circle. The Pockels cell accomplishes this purpose by having a voltage source 16 applied to provide a velocity difference between the $x$ and $y$ components of the incident vibration from the source 12. For a certain positive voltage namely the voltage at which quarter-wave retardation occurs, the $y$ component travels faster and is advanced 45 degrees in time while the $x$ component is delayed an equal amount and the output wave is right circularly polarized. For an equal negative voltage, the effects on the $x$ and $y$ components are reversed and the resultant output wave is left circularly polarized. For any other voltage between these particular positive and negative voltages the resulting phase difference is less than 90 degrees and the resultant output wave is elliptically polarized, or linear for zero voltage. Thus it may be seen that binary or analogue information can be impressed on the laser output, acting as a carrier, by controlling the voltage input to the Pockels cell 14. When the correct positive voltage is impressed on the Pockels cell, and is defined to represent a binary one, the output wave is right circularly polarized 32*b*. On the other hand, a negative voltage of the same magnitude could be defined to represent a binary zero and appears as a resultant left circularly polarized output 32*a*. Analogue information is transmitted by a continuous shift between the two aforementioned cases.

The foregoing provides an excellent transmitter of modulated, information-carrying light for transmission to an appropriate receiver, which is the subject matter of this invention. Usually receivers comprise a crossed analyzer and a photodetector to convert the variations in polarization directly to intensity variations, which is disadvantageous because of lower signal-to-noise ratio as compared to the present polarization modulation receiver.

The input to the receiver will be the right circularly polarized components 32*b* and the left circularly polarized components 32*a*, or elliptically polarized components; since all polarizations may be considered to be composed of circular components, however, it is sufficient to examine the operation of the receiver under two cases—left circular and right circular polarized inputs. The simplest device for producing or detecting circularly polarized light is a quarter-wave plate. Such plates are often made of thin sheets of split mica or of quartz cut parallel to the optic axis and having a thickness so as to include a 90 degree phase change between the $y$ and $x$ vibrations, which was discussed earlier as the input to the Pockels cell. The correct thickness of such plates can be computed by the equation $$d=2\alpha/(2\pi(\mu y-\mu x))$$

where $d$ is the thickness $\mu y$ and $\mu x$ are the principal indices of refraction, $\alpha$ is the phase difference and $\lambda$ is the wave length. Since the phase difference $\alpha$ depends upon the wave length, the principal indices for yellow sodium light $\lambda 5893$ are usually used for computing the required thickness for a quarter-wave plate. When a quarter-wave plate is oriented at an angle of 45 degrees with the plane of the incident polarized light, the emergent light is circularly polarized. However, if the input is circularly polarized, the output of the quarter-wave plate 18 is linearly polarized and at 45 degrees to the axes of the plate, with the quadrant of the output depending on the sense of the input. For instance, in FIG. 3, the output 34*b* is representative of the right circularly polarized light 32*b* and the component 34*b* is in the positive $x$ and $y$ quadrant since the right circularly polarized light was caused by a voltage with a positive sense. The left circularly polarized light 32*a* is represented at the output of the quarter-wave plate by component 34*a* which is in the second quadrant of positive $y$ and negative $x$ due to the left circularly polarized light being caused by the negative voltage signal.

Figure 4:
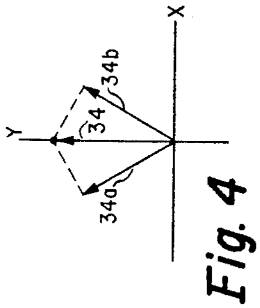
FIG. 4 is a representation of the amplitude of the output light beam of the quarter-wave plate and its component beams.
Figure 5:
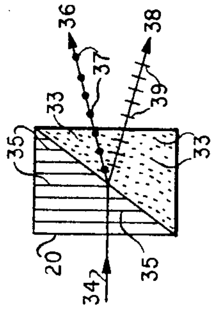
FIG. 5 is a schematic representation of a Wollaston prism and the direction of polarization of the light beam of FIG. 4 as it travels along the axis of propagation.
Figure 3:
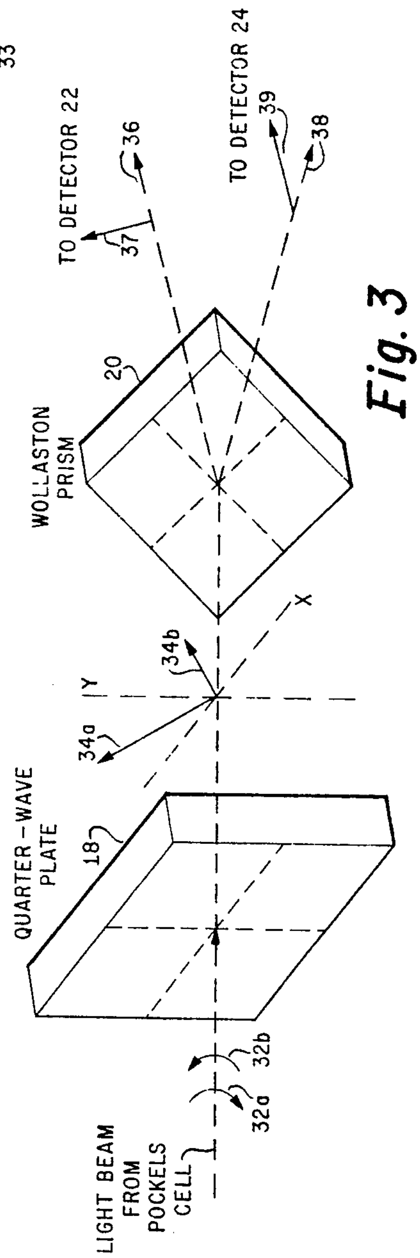
FIG. 3 is a schematic representation of a portion of the receiver of FIG. 1.

FIG. 3 also shows a Wollaston prism 20 which is a device for separting two input rays according to direction of polarization. It is useful at this point to separate or diverge components 34*a* and 34*b* for transmission to detectors 22 and 24. Actually, as shown in FIG. 4, 34*a* and 34*b* are components of a single beam 34, which is shown incident to the Wollaston prism 20 in FIG. 5. The optic axis 35 of the left half of the Wollaston prism is perpendicular to the incidence of the light beam 34 and the optic axis of the right half of the Wollaston prism has an optic axis 36 which is perpendicular to the plane of the page containing FIG. 5. In this way double refraction takes place at the boundary between the two halves or prisms of the Wollaston device. The components 34*a* and 34*b* are then represented respectively as parallel polarized output beam 36 (with dots 37 representing parallel polarization) for 34*a*, and perpendicularly polarized output beam 38 for component 34*b* (perpendicular polarization is represented by cross-lines 39).

At this point in the receiver, light beam 36 represents the negative voltage or binary zero and the light beam 38 represents the positive voltage or binary one. If these beams 36 and 38 are applied to photodetectors 22 and 24, respectively, and the output currents of the detectors are linear with respect to intensity changes, the outputs of the detectors represent the intensity by currents 40 and 42. A difference amplifier 26 subtracts the currents and current sensing equipment may then be used as a demodulator 28 for recognizing the information carried by the equipment. If zero information has been transmitted and received, detector 24 will have no output; and if a one has been transmitted and received, detector 22 will have no output.

For the case of analogue information, where intermediate modulation voltage levels result in the transmission of elliptically polarized light, a similar analysis yields intermediate demodulator outputs. More specifically, for an elliptically polarized input, the output of quarter-wave plate 18 comprises both of the orthogonal linearly polarized components 34*a* and 34*b*, with the amplitudes of the components being unequal; consequently, the light beams 36 and 38 produced by the Wollaston prism are of unequal intensity and applied concurrently to detectors 22 and 24; the difference in the output currents of the detectors is proportional to the modulating voltage, with a larger output from detector 22 indicating a negative sense and a larger output from detector 24 indicating a positive sense. If no modulating voltage is applied to Pockels cell 14, a linearly polarized light beam composed of equal left and right circularly polarized components is transmitted; in this event, the output of quarterwave plate 18 comprises equal amplitude orthogonal components *34a* and *34b*; this results in equal intensity light beams 36 and 38 being applied concurrently to detectors 22 and 24 and the generation of equal detector outputs.

It was stated as an object of the invention that angular alignment should not be critical among the components and that only axial alignment should be necessary for proper functioning. The invention has accomplished this object and this may best be expressed by defining the light at each point in the system in equation form. At the input to the Pockels cell modulator the light may be expressed in its *x* and *y* field components as $$E_x = E \sin \omega t \sin 45° = E' \sin \omega t$$
$$E_y = E \sin \omega t \cos 45° = E' \sin \omega t$$

where E' is the amplitude of the field and $\omega t$ is the angle of the field. The output of the Pockels cell in terms of field strength in the *x* and *y* direction will then be $$E_x = E' \sin (\omega t - (KE_z)/2)$$
$$E_y = E' \sin (\omega t + (KE_z)/2)$$

where the constant K is equal to $$(2\pi No^3 M)/\lambda$$

where N*o* is the ordinary index of refraction for no voltage, M is the electro-optic constant for a field along the *z* axis (axis of propagation), and $E_z$ is the modulating field along the *z* axis. Since $E_z$ is proportional to the voltage across the crystal of the Pockels cell, the equation of output can be represented as $$E_x = E' \sin (\omega t - (KV)/2)$$
$$E_y = E' \sin (\omega t + (KV)/2)$$

From the above equations it can be seen that the modulation voltage, V required for a given phase change is independent of crystal thickness making the selection of the Pockels cell crystal relatively uncritical.

In the receiver the angle between the components of the incoming wave to the quarter-wave plate and the output of the quarter-wave plate is unknown, so an arbitrary angle G is assumed and the output field strengths in the *x* and *y* direction are $$E_x' = -E' \cos (\omega t - KV) \cos G + E' \cos \omega t \sin G$$
$$E_y' = E' \sin \omega t \cos G + E' \sin (\omega t - KV) \sin G$$

The above equations assume that $E_x'$ is delayed 90° with respect to $E_y'$ in the quater-wave plate. The output of the quarter-wave plate is then applied to the Wollaston prism with the axis of the prism at 45° to the axis of the quarter-wave plate. The two components at the output of the Wollaston prism can then be represented by $$E_x'' = \sin 45° \, E'[(1 - \sin KV) \sin (\omega t + G) - \cos KV \cos (\omega t + G)]$$

$$E_y'' = \sin 45° \, E'[(1 + \sin KV) \sin (\omega t - G) + \cos KV \cos (\omega t - G)]$$

Therefore, $$E_x = E'' \sin (KV/2 + \pi/4)' \sin (\omega t + G - \pi/4)$$
$$E_y'' = E'' \cos (KV/2 + \pi/4) \sin (\omega t - G + \pi/4)$$

if E'' is used to substitute for common terms in both equations.

At this point it can be seen that only phase and not the intensity is dependent upon the orientation of transmitter and receiver. Since the photodetectors 22 and 24 operate with reference to intensities only, the recognition of information transmitted is independent of any phase changes that might occur due to angular misalignment between the transmitter and receiver.

As alternative embodiments for the invention, the Pockels cell for converting linear-polarized light to elliptical or circular-polarized light may be replaced by a Kerr cell or a travelling-wave modulator, or other devices, which are well known in the art as suitable for the purpose. Furthermore, if a mirror is placed at the output of a non-polarized source according to the well known Brewster angle, the unpolarized light from the source will be correctly polarized. Also, mirrors and lenses may be added to the system for aiding in the direction and focusing of the light beams on the various components.

In addition, the Pockels cell operation can be used to transmit a more direct mode of elliptically polarized light by applying light beam 30 so that the direction of vibration 31 is at an angle of other than 45° to the optic axes of the cell.

In this case, if the maximum and minimum values of modulator voltage are to produce two perpendicular elliptical polarizations, a device other than a quarter-wave plate will be required. In particular, if the system transmits linear polarization of varying direction, no wave plate at all is needed. However, this mode of operation requires rotational alignment of the receiver, as well as axial alignment. In addition, the receiver will no longer be insensitive to linearly polarized light.

That the present system has a higher signal to noise ratio than an intensity modulated system will be seen from the following analysis, for the case of binary modulation. The modulation, whether it be polarization or intensity modulation, is achieved by pulsing the modulation cell. At the receiver, suppose that on the average, N photons coming from the transmitter are detected per pulse and $N_b$ background photons are detected during the pulse time interval. The number of photons depends, of course, on factors such as the receiver area, its distance from the transmitter, and the quantum efficiency of the detector.

An intensity-modulated system converts the changes in the polarization of the light source to variations in intensity by passing the polarized light beam through a crossed analyzer. The actual number of photons, *n*, passthrough the analyzer and received at the detector of the receiver is distributed according to Poisson's law. In particular, the R.M.S. variation of *n* from pulse to pulse equals $\pm\sqrt{N}$. Thus, the signal-to-noise power ratio (R) of the received intensity-modulated signal is given by:

$$R = (\text{signal power})/(\text{noise power}) = N^2/(N + N_b + N_b^2)$$

Note that R is the ratio of power outputs, not current outputs. If a detector is added to the receiver to sample the background, and the output of this detector is fed to a difference amplifier, the average background noise component may be eliminated. However, the fluctuations in the background still cause variations in the output. In this case, the signal-to-noise ratio is given by $$R = N^2/(N + 2N^b)$$

In the polarization-modulated case, the voltage pulses applied to the Pockels cell are assumed to cause equal numbers of photons, on the average, for the right-circularly polarized and left-circularly polarized conditions to reach the receiver. The outputs of the detectors of the receiver are fed to the difference amplifier and subtracted. The variation in the resultant signal is given by the R.M.S. values of the individual variances to the two detector currents. Thus, the outputs of the difference amplifier for the two polarization conditions are as follows:

For right-circularly polarized transmission:
Output current $= N$
Variation of current $= \pm\sqrt{N + N^b}$,
R.M.S. value $= N + N^b$ For left-circularly polarized transmission:
Output current $= -N$
Variation of current $= \pm\sqrt{N + N^b}$,
R.M.S. value $= N + N^b$ The demodulator compares the two cases, i.e. takes the difference between the two difference amplifier outputs in R.M.S. form. The R.M.S. values are used since it is a correlation technique.

$$2N \pm \sqrt{2N + 2N^b}$$

The signal-to-noise power ratio is given by squaring the ratio of output to variation.

$$R = (2N)^2/(2N + 2N^b)$$

Comparing this with the signal-to-noise ratio obtained for the intensity-modulated systems shows that for negligible background, the signal-to-noise ratio for a polarization-modulated system is increased by a factor of two. For appreciable backgrounds the signal-to-noise ratio for a polarization-modulated system is increased over that obtainable with an intensity-modulated system, which does not employ a background sampling detector. (The signal-to-noise ratio of a polarization-modulated system is larger even if a background sampler is used.) The amount depends upon the intensity of the background; however, in severe backgrounds, the signal-to-noise ratio is four times that for the intensity-modulated case.

Furthermore, in an intensity-modulated system the circularly-polarized light intercepted at the receiver is reconverted to linearly-polarized light by a crossed analyzer and then detected by a photocell. However, a 50 percent loss in system efficiency occurs during the reconversion process in the intensity-modulated systems since, on the average, the transmitter is operated at half power (or half time) to accommodate the modulation.

It will additionally be noted that the information carrying ability of this system is in no way dependent on the time coherence of the light source 12. In a polarization modulation system, the effects of the modulation device can be distinguished from spontaneous variations in the intensity and/or phase of the light source. In the receiver of the present invention, however, these variations would produce identical changes in both of the polarization splitter outputs, so that the comparison circuit can be designed to ignore them. If the source produces random changes in polarization, the unwanted component can be removed by a Polaroid filter before the signal reaches the modulator, leaving only residual fluctuations in amplitude which will be ignored as explained above. Thus, if the source is completely incoherent (temporally) the quality of the received signal is not degraded, provided only that the receiver has a large enough bandwidth to accept the entire transmitted spectrum.

Although preferred and illustrative embodiments have been shown and described, changes and modifications will occur to one skilled in the art. It is the intention therefore, that the invention not be limited by the features shown and described, except as such limitations appear in the following claims.

What is claimed is:

1. A communication system comprising:
a transmitter including means for polarization modulating an electromagnetic wave in response to an input signal to thereby provide a carrier having polarization parameters depending on said input signal;
a receiver in axial alignment with said transmitted carrier, said receiver including:
means for converting said carrier to linearly polarized waves;
means for separating said linearly polarized waves according to direction of polarization;
detection means for the outputs of said last-mentioned means; and
means for reconverting the detected output to the form of said input signal.

2. An optical communication system comprising:
a source of linearly polarized light;
a source of modulating voltage;
a modulator in axial alignment with said source of light and controlled by said modulating voltage for converting the linearly polarized light from said source of light to light having polarization parameters depending on the value and sense of said modulating voltage,
receiving means including:
a wave plate and a polarization splitting device axially aligned with each other and the incoming modulated light;
detection means for the outputs of said polarization splitting device;
a signal comparison circuit for said detection means; and
demodulating means for the output of said signal comparison circuit.

3. An optical communication system comprising:
a source of linearly polarized light;
a source of binary information;
a modulator in axial alignment with said source of light for converting the linearly polarized light from said source to left or right circularly polarized light beams depending on the state of the binary source, the output of said binary source being applied to said modulator as the modulating signal;
a receiver including a quarter-wave plate and a polarization splitting device for converting said circularly polarized light to linearly polarized light components, each component representing a binary state; and
demodulating means for said receiver to convert said binary values to binary information in the same form as it was at the source.

4. An optical communication system comprising:
a source of linearly polarized light;
a source of modulating voltage;
a modulator in axial alignment with said source of light and controlled by said modulating voltage for converting the linearly polarized light from said source of light to elliptically polarized light, the ellipses being oriented according to the value and sense of said modulating voltage;
receiving means including a wave plate and a polarization splitting device axially aligned with each other and the incoming modulated light;
detection means for the outputs of said polarization splitting device;
a signal comparison circuit for said detection means; and
demodulating means for the output of said signal comparison circuit.

5. An optical communication system comprising:
a source of linearly polarized light;
a source of modulating voltage;
a Pockels cell modulator in axial alignment with said source of light and controlled by said modulating voltage for converting the linearly polarized light from said source of light to elliptically polarized light, the ellipses being oriented according to the value and sense of said modulating voltage, said modulator having an optic axis at an angle of 45° to the direction of said linear polarization;
receiving means including a wave plate and a Wollaston prism axially aligned with each other and the incoming modulated light, the optic axes of said prism being oriented at 45° with respect to the optic axes of said wave plate;
detection means for the outputs of said Wollaston prism;
a signal comparison circuit for said detection means; and
demodulating means for the output of said signal comparison circuit.

6. An optical communication system comprising:
a source of linearly polarized light,
a source of modulating voltage;
a Pockels cell modulator in axial alignment with said source of light and controlled by said modulating voltage for converting the linearly polarized light from said source of light to circularly polarized light in a direction depending on the sense of said modulating voltage, said modulator having an optic axis at an angle of 45° to the direction of said linear polarization;

receiving means including a quarter-wave plate and a Wollaston prism axially aligned with each other and the incoming modulated light, the optic axes of said prism being oriented at 45° with respect to the optic axes of said quarter-wave plate;

detection means for the outputs of said Wollaston prism;

a signal comparison circuit for said detection means; and demodulating means for the output of said signal comparison circuit.

References Cited by the Examiner

UNITED STATES PATENTS

| | | | |
|---|---|---|---|
| 1,997,628 | 4/1935 | Chubb | 250—199 |
| 2,531,951 | 11/1950 | Shamos et al. | 250—199 |
| 2,707,749 | 5/1955 | Mueller | 250—199 |
| 2,928,075 | 3/1960 | Anderson. | |
| 2,998,746 | 9/1961 | Gievers | 88—65 X |
| 3,126,485 | 3/1964 | Ashkin et al. | 250—199 |

FOREIGN PATENTS

| | | |
|---|---|---|
| 132,858 | 9/1919 | Great Britain. |

DAVID G. REDINBAUGH, *Primary Examiner.*

JOHN W. CALDWELL, *Assistant Examiner.*